No. 722,059. PATENTED MAR. 3, 1903.
J. F. VOLLE.
EYEGLASS.
APPLICATION FILED NOV. 12, 1900.
NO MODEL.

Witnesses

Inventor
J. F. Volle,
By Victor J. Evans, Attorney

UNITED STATES PATENT OFFICE.

JOHANN F. VOLLE, OF SCRANTON, MISSISSIPPI.

EYEGLASS.

SPECIFICATION forming part of Letters Patent No. 722,059, dated March 3, 1903.

Application filed November 12, 1900. Serial No. 36,239. (No model.)

*To all whom it may concern:*

Be it known that I, JOHANN F. VOLLE, a citizen of the United States, residing at Scranton, in the county of Jackson and State of Mississippi, have invented new and useful Improvements in Eyeglasses, of which the following is a specification.

My invention relates to frameless eye lenses or glasses, the object being to provide an eye lens or glass which will require no frame or attaching means, but will be supported in position upon the eyeball by the contact therewith of the eyelids.

The invention consists in the construction and arrangement of the device, as will be hereinafter described, and pointed out in the claim.

Figure 1:
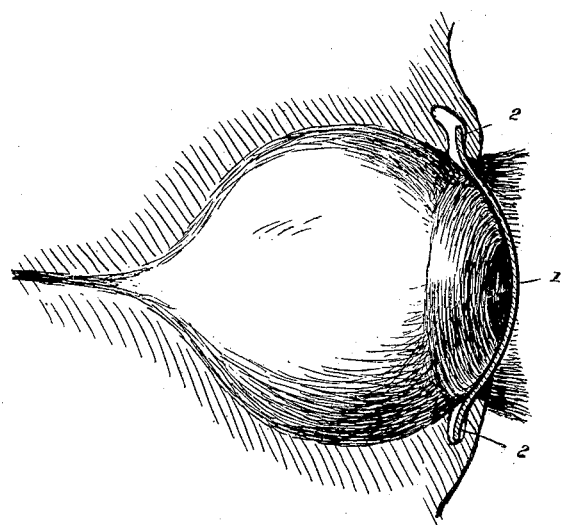
Figure 2:
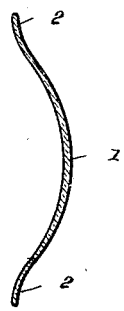
Figure 3:
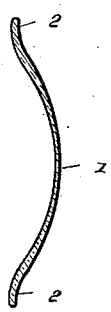
Figure 4:
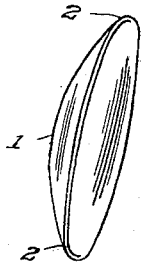

In the accompanying drawings, Figure 1 is a vertical section of a glass embodying the invention and shown in position in the eye, and Figs. 2 and 3 are vertical sections of different forms of the lens or glass. Fig. 4 is a perspective view of a lens or glass.

The reference-numeral 1 designates a glass or lens of concavo-convex form and having its edges 2 slightly curved to adapt them to fit under the eyelids.

The specific form of lens is of course immaterial and will vary with the requirements of the user—that is to say, the glass will have more or less magnifying power or will be arranged to compensate for astigmatism, &c., the same as the lenses of ordinary glasses.

The illustration in Fig. 1 shows the manner of applying the glass to the eye, it being only necessary to place the glass on the eyeball, allowing the eyelids to overlap the edges 2 of the glass to retain it in position.

The invention is adapted not only for use as an aid to the vision, but may be made in imitation of the eyeball and used as a substitute for the glass eyes in common use without the necessity of removing the eyeball, as is now necessary before the ordinary glass eye can be inserted.

It will be obvious that my improvement avoids the annoyance and inconvenience incident to the use of the usual spectacle-fastenings or the spring employed with what are termed "nose-glasses."

I claim—

An eyeglass comprising a lens constructed in concavo-convex shape so as to conform to the configuration of the ball of the eye when resting thereon, and provided with a rearwardly-curved surrounding edge portion to engage the inner surface of the eyelids of the eye, substantially as specified.

In testimony whereof I affix my signature in presence of two witnesses.

JOHANN F. VOLLE.

Witnesses:
A. L. MOORE,
E. L. MANSFIELD.